Aug. 4, 1953 — C. E. LAUNIUS ET AL — 2,647,613
GLASSWARE LEHR LOADER
Filed Aug. 5, 1949 — 6 Sheets-Sheet 2

INVENTORS:
CARL E LAUNIUS,
HOMER L. BREWER,
BY Rogers & Ezell
ATTORNEYS.

Aug. 4, 1953

C. E. LAUNIUS ET AL

2,647,613

GLASSWARE LEHR LOADER

Filed Aug. 5, 1949

C. E. LAUNIUS ET AL 2,647,613

GLASSWARE LEHR LOADER

Filed Aug. 5, 1949

INVENTORS:
CARL E. LAUNIUS,
HOMER L. BREWER,
By Rogers + Ezell
ATTORNEYS.

UNITED STATES PATENT OFFICE 2,647,613

GLASSWARE LEHR LOADER

Carl E. Launius and Homer L. Brewer,
East St. Louis, Ill.

Application August 5, 1949, Serial No. 108,686

24 Claims. (Cl. 198—31)

The present invention relates to a glassware lehr loader or the like, and more particularly to a mechanism that can take a large number of glassware units, such as bottles traveling in a particular line with continuous movement, and transfer them from that line to another point where it can deposit them, and where in the usual arrangement they then travel transversely to the direction of travel on the original line.

The most particular use of this device is for loading a glassware annealing lehr. Glassware, such as bottles, is formed in the machine that delivers the items one at a time to a conveyer where they travel, usually single file, toward a point of discharge from the conveyer. The conveyer is continuously operating and the bottles are delivered to it so that they move with it in a predetermined spaced relationship. A lehr, on the other hand, is an apparatus having a very slow moving, but wide, conveyer in it. As a result of the difference in width of the ware take-out conveyer from the ware take-out conveyer leading from the glassware forming machine, and their differences in speed, it is required that there be some apparatus that will transfer the ware from single file travel at high speed in somewhat spaced relationship to a multiple file at very low speed.

Heretofore, one of the principal commercial types of lehr loaders has been a type involving a swinging arm that moves in an overhand fashion, usually picking up one bottle at a time from the ware take-out conveyer, lifting it and swinging it and depositing it upon the lehr conveyer. This arm is caused to move slightly about a vertical axis with each of its cycles, so that the bottles are disposed across the lehr conveyer.

It is an object of the invention to provide a simplified type of lehr loader. Especially is it an object to provide a lehr loader that can handle a large number of bottles at one time, and most particularly one that can handle, in a single cycle, an entire file of bottles that will extend across the lehr conveyer.

It will also be seen that the present lehr loader is capable of receiving a substantial number of bottles by overlying the ware take-out conveyer, so that the bottles traveling along the conveyer are successively delivered to the lehr loader in closely spaced relationship, which is the relationship that they will have when they are disposed across the lehr conveyer. And the present lehr loader is then adapted to lift the charge of bottles off of the take-out conveyer and swing them to a position over the lehr conveyer, whereupon it descends so that the charge of bottles is resting upon the lehr conveyer. Then the lehr loader elevates its holding arm away from the bottles that have been released upon the lehr conveyer and returns to pick up another group.

It will appear that the cycle of this machine requires accurate timing, and that there are means to afford the same. Obviously, also, there are means designed in the form of an arm for taking hold of, carrying and releasing the group of bottles. In one of the modifications of this machine, there is a means for causing the arm to deposit the bottles at an elevation different from that at which it picks them up. Of course, in any case, the arm, since it overlies the bottles, must have lift-off phases of its cycle when it initially removes the bottles from the ware take-out conveyer, when it deposits them on the lehr conveyer, when it leaves the deposited ware, and when it returns to its starting position. Hence the cycle includes both swinging the ware holding arm and changing its elevation, and the previously mentioned means to deposit the ware at an elevation different from that at which it was picked up is something that is over and above the vertical displacement of the arm in any cycle.

It may also be desirable to have a ware pusher that, after the ware has been deposited onto the lehr conveyer, pushes it into the mouth of the lehr or at least toward the mouth of the lehr. This has been provided and is illustrated in one embodiment of this invention.

Another feature of the invention is the operation and control of the entire mechanism from a single power source. This power source can provide the swinging movement to the arm to displace the ware from the one conveyer to the other, and it also can apply the vertical movement to the arm or it can control air valves or the like that are fixedly set to time the vertical movement with respect to the swinging movement. Valves are also provided for controlling the other phases of the operation such as the clamping operation of the ware holding arm upon the ware, and its release, and also a retarding means to hold back ware on the take-out conveyer to prevent it from jamming the operation when the arm is ready to move.

Other objects and features of the invention will appear from the description to follow.

Referring particularly to the embodiment of the machine illustrated in Figs. 1 through 13, there is a ware take-out conveyer generally indicated at 30. This apparatus includes a conveyer belt 31 that continuously operates to conduct ware from a glass forming machine or the like. As is known in the art, the ware is deposited at spaced intervals along the conveyer and is carried thereby toward the right end of the conveyer as it appears in Fig. 1. Adjacent the right end of the conveyer, there is a stop 32 that extends across the belt 31 so as to prevent the bottles from passing beyond it. Also, for a distance near the end of the conveyer, there are side rails 33 of predetermined height that assure the proper alignment of the ware in single file along the top of the conveyer at its end.

Figures 1, 7:
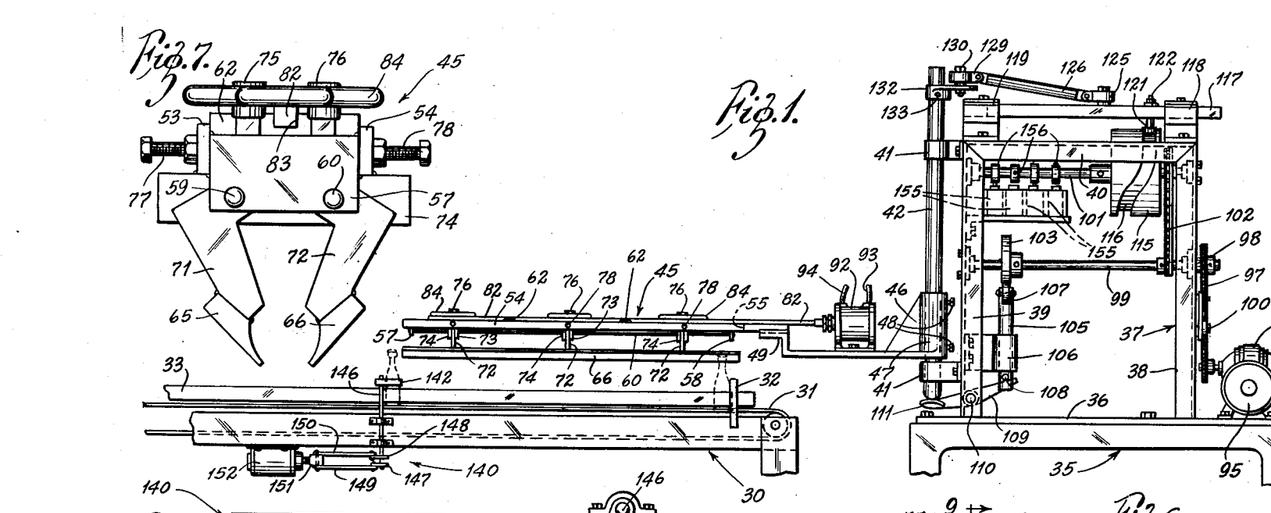
Fig. 1 is a side elevation of the first embodiment of the apparatus, disposed over the ware take-out conveyer, which latter is shown fragmentally.
Fig. 7 is an end elevation of the ware holding arm, taken from the left end of Figs. 1 and 6.

The present machine is shown here as mounted upon a suitable support platform 35 that is elevated to the proper distance by legs that are shown only fragmentally in Fig. 1. The machine itself includes a base plate 36 that is mounted upon the platform 35. Above the plate 36, there is a support or frame, generally indicated at 37, and including a channel-shaped back member 38, a front member 39 and two angle iron top members 40. A comparison of Figs. 1 and 3 will indicate that the flanged or channel members have some substantial width so as to provide adequate support in all directions.

As will appear, there is a vertical shaft that produces the desired movement of the ware conveying arm that is of the essence of this machine. To this end, the front support element 39 has upper and lower spaced bearings 41 that afford both vertical and rotary movement to a shaft 42. The mechanism to provide the desired movement to the shaft 42 will be described hereafter.

The ware conveying and supporting arm is generally indicated at 45, and is shown as extending out from the main support portion 37 of the machine. It includes a bracket 46 to which the main projecting part of the arm is fixedly attached. This bracket 46 includes a sleeve 47 that surrounds the shaft 42 to support the arm upon the shaft. In order to secure the arm in a proper position vertically along the shaft 42, the sleeve 47 may be moved along the shaft 42 and finally secured in its desired position by setscrews 48 (Fig. 5).

Figures 3, 4, 5:
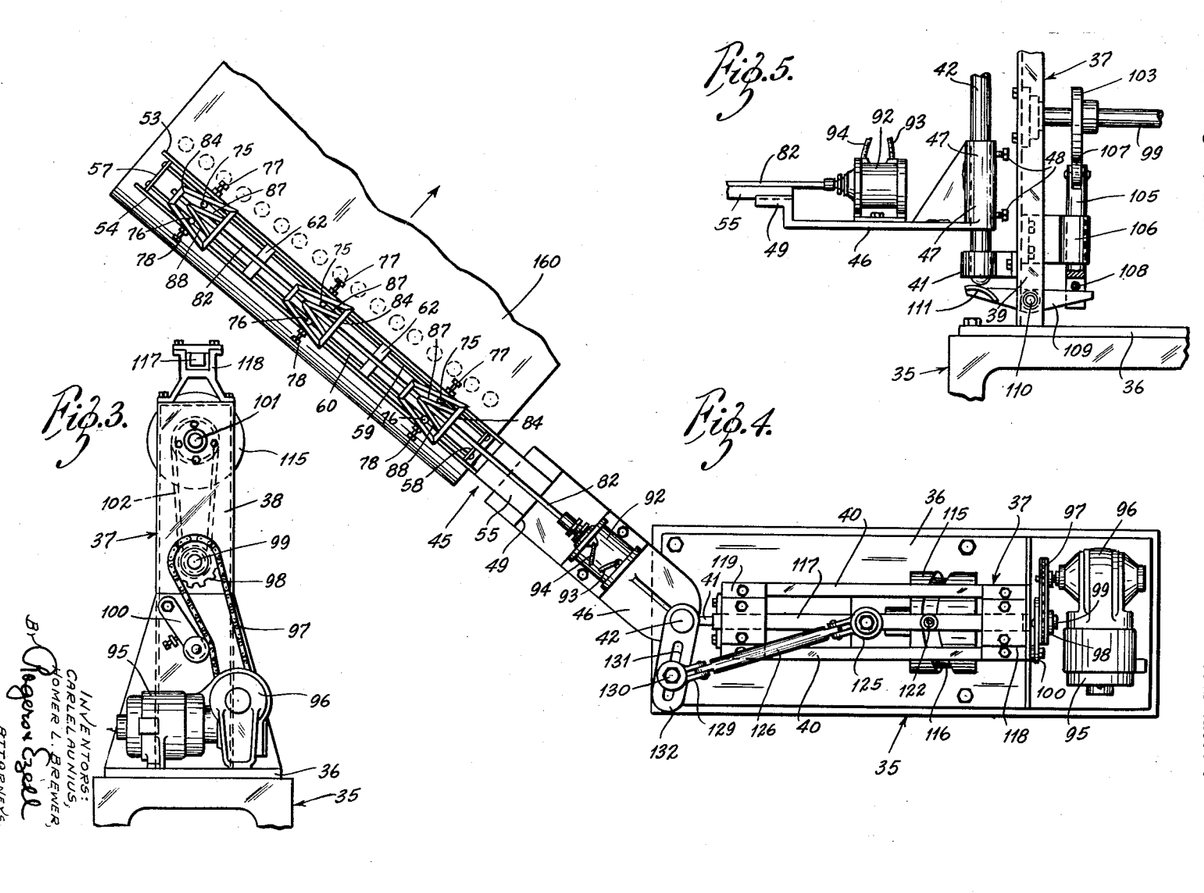
Fig. 3 is an end view of the apparatus, taken from the right end of Figs. 1 and 2.
Fig. 4 is a plan view of the apparatus with the arm swung over the lehr conveyer.
Fig. 5 is a fragmental view, somewhat enlarged, of the mounting of the arm, shown in its elevated position.
Figure 6:
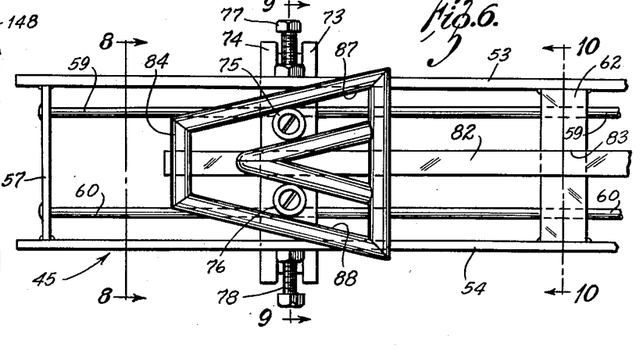
Fig. 6 is a fragmental plan view of one end of the ware holding arm.

The outer end of the bracket 46 is stepped upwardly and outwardly as shown at 49 in Fig. 5, and to this portion 49 the main structure of the arm 45 is attached as by welding or the like.

The arm itself is of framework construction. It includes two laterally spaced beams 53 and 54. A top plate which joins the inner end of the two beams 54 is shown at 55, and overlies the portion 49 of the bracket 46 to give a box-like construction at this end to insure adequate strength. In addition to this, the two beams 53 and 54 are attached together at their outer ends by a cross plate 57, and there is a similar cross plate 58 near to the inner end. Between the two cross plates 57 and 58 are supported two pivot bars 59 and 60 for a purpose to appear. These pivot bars also increase the strength of the arm 45. A reference to Fig. 1 will show that the two end plates 57 and 58 depend below the rails 53 and 54 and support the rods 59 and 60 in locations below the two rails.

The two beams 53 and 54 are also connected by cross plates 62 that are spaced at suitable intervals along the length of the arm. These cross plates 62 project slightly above the two beams 53 and 54 and are disposed a distance above the rods 59 and 60. As will appear, they provide tracks for an actuating member.

Figures 2, 8, 9, 10, 11:
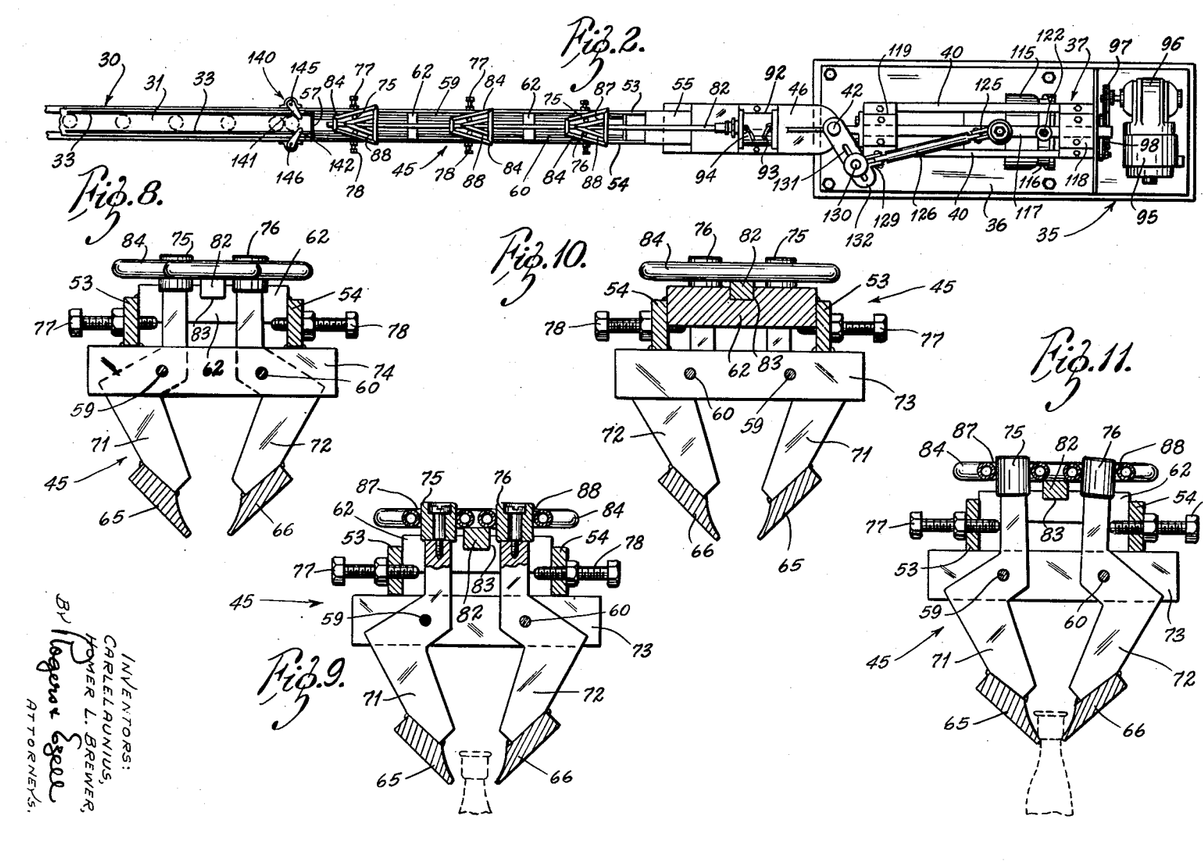
Fig. 2 is a plan view of the apparatus as it appears in Fig. 1.
Fig. 8 is a transverse section through the ware holding arm, taken on the line 8—8 at the left of Fig. 6.
Fig. 9 is a transverse section through the ware holding arm, taken on the line 9—9 just to the left of the middle of Fig. 6.
Fig. 10 is a transverse section through the ware holding arm, taken on the line 10—10 to the right of Fig. 6 and looking in the direction opposite to that from which Figs. 7, 8 and 9 have been taken.
Fig. 11 is a section similar to Fig. 9, but with the wareholding rails in ware engaging position in contrast to Fig. 9.

The arm 45 is designed to extend lengthwise directly above the conveyer belt 31 and to receive a single file of glass bottles below it. It is also designed to clamp these bottles in a single operation by engaging just under their "finish" (or enlarged mouth) portions, so that the bottles can be lifted and conveyed to another point. In order to accomplish this, there are two long rails 65 and 66 that are pivotally mounted on the arm 45 for swinging movement toward and away from each other to provide the clamping action aforesaid. Preferably, the two rails are tapered on their lower ends, as is indicated in Figs. 7 through 11. Fig. 11 shows the manner in which the two rails can come together to engage and clamp a bottle; whereas in Fig. 9 the rails are separated to permit the arm to be swung down over the bottles.

As is shown clearly in Fig. 1, the two rails 65 and 66 are of a substantial length so that in a single operation they may engage a large number of bottles.

The two rails 65 and 66 are supported upon a plurality of rocker arm units. As shown in Figs. 8 through 11, the rail 65 is mounted upon rocker arm 71 that pivots upon the pivot rod 59 extending along the arm 45. In corresponding fashion, the rail 66 is mounted upon a rocker arm 72 that is pivotally mounted upon the rod 60. In the illustration, there are three sets of such rocker arms, spaced at even intervals along the length of the arm 45 between the end plates 57 and 58.

In order to stabilize the arms 71 and 72 against movement along the two pivot rods 59 and 60, each pair of these arms is held between two spaced plates 73 and 74, which plates are welded or otherwise firmly secured across the bottom of the two beams 53 and 54.

In order to secure the swinging or opening and closing movement of the two rails, the several pairs of arms 71 and 72 are cam actuated. To accomplish this, they extend upwardly above the rods 59 and 60, through the principal framework of the arm 45, to a position above it, where they have cam rollers 75 and 76, respectively, attached to their upper ends. In order to adjustably limit the closing movement of the rails 65 and 66, which is a separating movement of the upper ends of the two arms 71 and 72, there are two abutment screws 77 and 78, respectively, mounted in the two beams 53 and 54 with proper lock nuts.

The opening and closing of the rails 65 and 66 is obtained by a reciprocal motion of a bar 82. This bar extends along the top of the arm 45 and is supported in square grooves 83 in the upper edges of the cross plates 62. Reference to Figs. 8 through 11 will show that the bar 82 is square in the area of the notches 83, so that it cannot rotate or twist during its operation. The bar 82 has attached to it, at intervals spaced above the several sets of arms 71 and 72, a plurality of V-shaped cams 84 that fit above the several cam rollers 75 and 76. One of these cams 84 is illustrated particularly in Fig. 6, and they are shown also in Figs. 8 through 11. In the preferred construction, they may be fabricated from tubular or rod stock to afford two V-tracks 87 and 88. The roller 75 is designed to ride in the V-track 87 and the roller 76 to ride in the V-track 88. It may be seen that, when the bar 82 with the cams 84 is moved to the left in the several drawings, it will separate the two rollers 75 and 76 and cause the two rails 65 and 66 to move together. Conversely, when the bar 82 with the cams 84 move to the right in these views, it will cause the two rollers 75 and 76 to be moved toward each other, causing separation of the rails 65 and 66.

The reciprocation of the rod 82, and hence the displacement of the cams 84 and actuation of the rails 65 and 66, is obtained from a pneumatic motor 92 that is mounted upon the bracket 46. As will be understood, this motor 92 has a piston connected to the bar 82. There are opposite air lines 93 and 94 leading into the cylinder of the motor 92, and these, in the manner known, are oppositely connected to high and low pressure, alternately, to cause the forward and backward reciprocation of the piston and hence of the bar 82. These two air lines are regulated by valves, as will appear.

From the foregoing, it may be seen that the arm 45 is adapted to fit over and selectively to clamp a plurality of bottles that have been delivered beneath it by the conveyer belt 31. The objective thereafter is to lift the bottles away from the conveyer 31 above the guides 33, and transfer them to a lehr conveyer, which is spaced away from the conveyer 30. Lehrs are generally made with very slow moving and wide belts, and this invention is designed to set the entire line of bottles removed from the conveyer 31 onto the lehr conveyer belt, transversely thereof. Thus the arm must lift the bottles from the conveyer 31, swing them over to a position transversely of the lehr belt, deposit them on the lehr belt, release them, and lift itself away from them to come back to its original position to receive another set of bottles from the conveyer 30.

The entire vertical and swinging movement of the arm 45 in this embodiment is obtained by a motor 95 that is mounted at the right end of the base plate 36 of the main support. As shown especially in Figs. 1 and 3, the motor 95 operates through a suitable gear box 96 and a sprocket chain 97 to rotate a sprocket wheel 98 that is mounted upon a primary drive shaft 99. The drive shaft 99 extends across the front and rear supports 38 and 39 and is rotatably mounted in suitable bearings therein. A sprocket chain tightener 100 is provided for maintaining proper tension upon the sprocket chain 97. This chain tightener may be of conventional construction.

In addition to the primary drive shaft 99, there is a secondary drive shaft 101. It may be predicted that the drive shaft 99 is here shown as the one that obtains the vertical movement of the arm 45; whereas the secondary shaft 101 obtains the swinging movement and the valve operation. The shaft 101 is driven from the shaft 99 by means of a speed-reducing sprocket chain or other similar arrangement 102.

Near its left end, the shaft 99 has a cam 103 attached to it. This cam 103 is adapted to produce predetermined vertical movement of a rod 105 that is suitably mounted in a bearing bracket 106 attached to the forward frame member 39. The upper end of the rod 105 has a cam follower roll 107 on it. Below the bearing bracket 106, the rod 105 has a cross pin 108 on it. This cross pin is adapted to engage and cause rocking of a rocker arm 109 that is journaled on a shaft 110 that is borne in the flanges of the support 39. The support is open at this area so that the rocker arm 109 can project outwardly from the frame member 39 and, at its outer end, the rocker arm 109 has a curved shoe 111. This shoe supports the lower hemispherical end of the shaft 42. When the rocker arm 109 rocks in a clockwise direction from that shown in Fig. 1, it will elevate the shaft 42, the shoe 111 providing a proper surface for this elevation with a minimum of friction. It will be understood that the cam 103 provides the proper timing of the vertical movement of the shaft 42, and hence of the arm 45.

As already stated, the swinging movement of the shaft 42 and the arm 45 is obtained from the secondary shaft 101, which is mounted in suitable bearings between the forward and rear frame members 38 and 39. This movement is controlled by a cylindrical cam 115 having a cam groove 116 therein of predetermined shape. This cam groove 116 is designed to obtain certain reciprocating movement of a squared bar 117 that is mounted in suitable bearings 118 and 119 that are attached above the top members 40 of the support 37. The bearing 118 may be understood by particular reference to Figs. 1 and 3.

The bar 117 has attached to it a cam follower 121 in the form of a roller that is attached to a shaft 122 that extends through and is properly secured to the bar 117.

The bar 117, therefore, will be moved back and forth as the cam 115 rotates and as the roller 121 tracks in the groove 116. The bar 117 supports a clevice-like swivel 125 to which a pitman arm 126 is pivotally attached. The pitman 126, at its outer end, is similarly pivotally attached to another swivel 129. The swivel 129 is mounted upon a bolt 130 that is secured adjustably in a slot 131 extending lengthwise of a crank arm 132. The crank arm 132 is attached to the upper end of the shaft 42. The arm 132 has a sleeve so that it may be adjusted angularly and vertically on the shaft 42 and secured in properly adjusted position. A setscrew 133 will hold it in such position. By this means, the reciprocation of the bar 117 in a pattern determined by the cam track 116 will cause angular movement of the shaft 42.

Figures 12, 13:
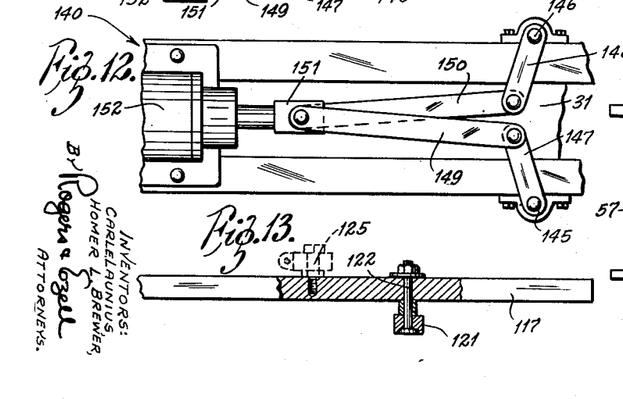
Fig. 12 is a bottom view of the ware retarding device associated with the take-out conveyer.
Fig. 13 is a fragmental side view partly in section of a cam following slide employed in the swinging of the arm.

In view of the fact that the arm 45 must extend above the top of bottles accumulated at the end of the conveyor 31, and then take sensible time to engage the bottles and lift them away from the conveyor belt 31, it is necessary to prevent additional bottles on the conveyor belt from crowding into those being removed. To this end, a properly timed withholding or retarding apparatus 140 is secured to the conveyor 30. It is shown particularly in Figs. 1, 2 and 12. It has a pair of gate elements 141 and 142 that are swingable above the top of the conveyor 31. The two gate elements are secured to and rock with a pair of vertical rocking shafts 145 and 146 that are secured in suitable bearings along the side frames of the conveyor 30 to project below the side frames. At their lower ends, the two shafts 145 and 146 have crank arms 147 and 148, respectively, attached to them (Figs. 1 and 12). The crank arms are, in turn attached to a pair of links 149 and 150, respectively, that are pivotally attached at their ends to a head 151 on the piston of an air motor 152. It will be seen that, when the air motor 152 is energized to reciprocate its piston, the gates 141 and 142 are moved to either an open or a closed position. That is to say, the gates extend across the conveyor belt 31, as shown in Fig. 2, to prevent movement of the bottles, or they are moved away from such position to permit passage of the bottles.

The two air motors 92 and 152 are energized for their operations in timed relations by a plurality of valves 155 that are mounted on a bracket attached to the frame 37 in its upper left portion illustrated in Fig. 1. These several valves 155 are actuated by a corresponding number of cams 156 that rotate with the secondary shaft 101. By this means, the operation of the two motors 92 and 152 is properly timed to coordinate with the vertical and swinging movements of the arm 45, to transfer the bottles from the ware take-out conveyor 31 to a lehr conveyor 160.

*Operation of the first embodiment*

The machine that has been described is designed to transfer bottles or like objects from the forming machine along the conveyor 31, to the lehr loading conveyor 160. In this embodiment, it is assumed that the bottles come in single file and at spaced intervals on the belt 31. It is also assumed that the lehr conveyor 160 is displaced at some suitable angle to the conveyor belt 31, and that the two conveyors are at the same elevation.

The over-all operation consists in the collecting of a single-file series of bottles at the end of the conveyor 31, the grasping of these bottles by the arm 45, the lifting and the swinging of the arm with the bottles to a position over the conveyor 60, and the final deposit of the bottles in a transverse line across the conveyor 60.

As the bottles are ordinarily spaced an excessive distance apart in their single file on the conveyer 31 relatively to their lateral spacings on the conveyer 160, the stop 32 is provided so that the foremost bottle coming along the conveyer 31 will be held against movement while the conveyer slips beneath it. Additional bottles come up behind the foremost bottle, abut it, so that a line of bottles is accumulated that extends substantially from end to end of the two rails 65 and 66.

As the upper ends of the bottles must be located between the rails 65 and 66 of the arm 45, the two side guides 33 are provided to insure that the bottles are in a proper line. Hence the bottles are properly disposed on the conveyer to be engaged by the two rails 65 and 66 while the same are in their open position, as illustrated in Fig. 9.

When a proper number of bottles is collected beneath the arm 45, one of the cams 156 operates its valve 155 to energize the motor 152 and actuate the gates 141 and 142 to the positions illustrated in Fig. 2. Thereupon no more bottles can move under the arm 45. Substantially simultaneously with the foregoing action, another of the cams 156 operates another valve to cause the energization of the air motor 92, which thereupon displaces the rod 82 outwardly, carrying with it the several V-cams 84. These cams track the several rollers 75 and 76 to spread the upper end of the arms 71 and 72, causing said arms to pivot about the two rods 59 and 60, and to move the rails 65 and 66 into bottle clamping position illustrated in Fig. 11.

When the clamping is effected, the cam 103 will have rotated to a point where it gives a rapid depression to the plunger 105 so that the pin 108 depresses the inner end of the rocker arm 109. The outer end 111 of the rocker arm 109 then lifts the shaft 42 to which the arm 45 is securely attached. The lifting is sufficient to elevate the arm 45 enough to have the bottoms of the bottles engaged by the arms clear the rails 33 and all parts associated therewith.

During the foregoing operation, as the shaft 101 rotates at half the speed of the shaft 99, the cylindrical cam 115 will have been rotating, but the shape of the groove 116 is such that the roller 121 is not yet displaced. As soon as the elevation of the arm 45 is sufficient, the track 116 causes the displacement of the roller 121, which carries the slide bar 117 forwardly, or leftwardly in the several views. As the pitman 126 is swiveled to the slide bar 117, it is caused to be moved to the leftward. However, its outer end is also swiveled to the crank arm 132 so that this leftward movement of the pitman 126 causes the crank arm 132 to rock, and the shaft 42 rocks with it. The total amount of displacement of the slide bar 117 is determined by the shape of the groove 116 in the cylindrical cam 116; but the total amount of movement of the arm 42 angularly is determined by the position of the swivel 129 with respect to the slot 131.

In the illustration, the conveyer 160 is displaced about forty-five degrees angularly from the other conveyer, and the thrust rod swivel 129 is connected at some mid point in the slot 131.

This swinging movement disposes the arm 45 above the lehr conveyer 160, as illustrated in Fig. 4. This is accomplished by a bit less than a half revolution of the cylindrical cam 116. Owing to the fact that the shaft 101 travels only one-half as fast as the main shaft 99, the travel aforesaid of the cam 115 will be accompanied by almost a full revolution of the cam 103.

As the cam 103 approaches the end of its single revolution, it will again cause a lowering of the arm 45. This action is produced by an upward movement of the shaft 105 when the roller 107 follows the return or inward curvature of the cam 103. By this means, the bottles are lowered onto the conveyer 160. When they reach their position on the conveyer, the valve 155 appropriate thereto is actuated by its cam 156 to again actuate the motor 92 and cause it to move in a return or inward direction, thus separating the rails 65 and 66 and permitting the deposit of the bottles onto the conveyer 160. The rails are caused to open a distance somewhat greater than the size or cross-sectional dimension of the tops of the bottles.

As soon as the bottles are released, the cam 103 starts another cycle, causing the elevation of the arm 45 so that it is lifted above the bottles that have been deposited upon the lehr conveyer 160. Thereupon the return swinging movement of the arm 45 is produced by the second half of the cam 115, and the arm 45 is returned to its original position above the conveyer 31. As it reaches the end of this return angular movement, the cam 103 again lowers the rails 66 above the conveyer 31.

As soon as the arm 45 is initially lifted away from and angularly swung from the conveyer 31, the motor 152 is operated in a reverse direction by its appropriate valve 155 to re-open the gates 141 and 142 and permit an additional charge of bottles to move down into position where they can be grasped by the arm 45. Hence, when the arm 45 is returned to its initial position, there is another charge of bottles ready to be moved. The cycle then repeats itself.

*The embodiment of Figs. 14–21*

The embodiment of the invention shown in Figs. 14–21 is basically the same in its operation as that previously described. However, this embodiment includes a means for displacing the arm vertically so that it can operate with a glass machine conveyer that is at a different elevation from that of the lehr conveyer. Also, the second embodiment has a means for pushing the bottles that are discharged onto the lehr conveyer forwardly away from the transfer arm.

This embodiment is shown as mounted upon the top of a lehr, which is generally indicated at 200. This lehr has a conveyer 201 that moves into an opening or mouth 202 at the forward end of the lehr.

The arm 205 in the second embodiment is basically the same as the arm 45 previously described, and its clamping rails are actuated by a pneumatic motor 204 that corresponds to the motor 92. In this case, however, the arm 205 is supported by a bracket 206 that is rigidly attached to a split sleeve 207. The sleeve 207 is of the slip collar type and is adjustably but securely attachable to a cylinder 209 by means of the clamping screws 208.

The cylinder 209 is part of a pneumatic motor, and is movable in combination with a fixed piston. To accomplish this, there is a vertical shaft 210 that is suitably supported in a bearing 211 that rests upon the lower floor F. It also may be suitably secured at its upper end by a suitable bearing 212 so that it is held as a column for the supporting of the arm and associated mechanism.

Between its ends, the shaft 210 has a fixed piston 213 (Figs. 20, 21) with proper sealing cups. This piston is received within the cylinder 209. The ends of the cylinder are closed by cylinder heads 214 and 215 that are provided with packing so that the cylinder may slide up and down on the shaft 210 when air or other similar fluid means is introduced above or below the piston 213. To provide for the pressure and exhaust, there are upper and lower air lines 216 and 217 that enter the top and bottom of the cylinder 209 above and below the piston 213. These connections 216 and 217 are flexible so that their other ends may be attached to the relatively fixed valve.

Figures 14, 20:
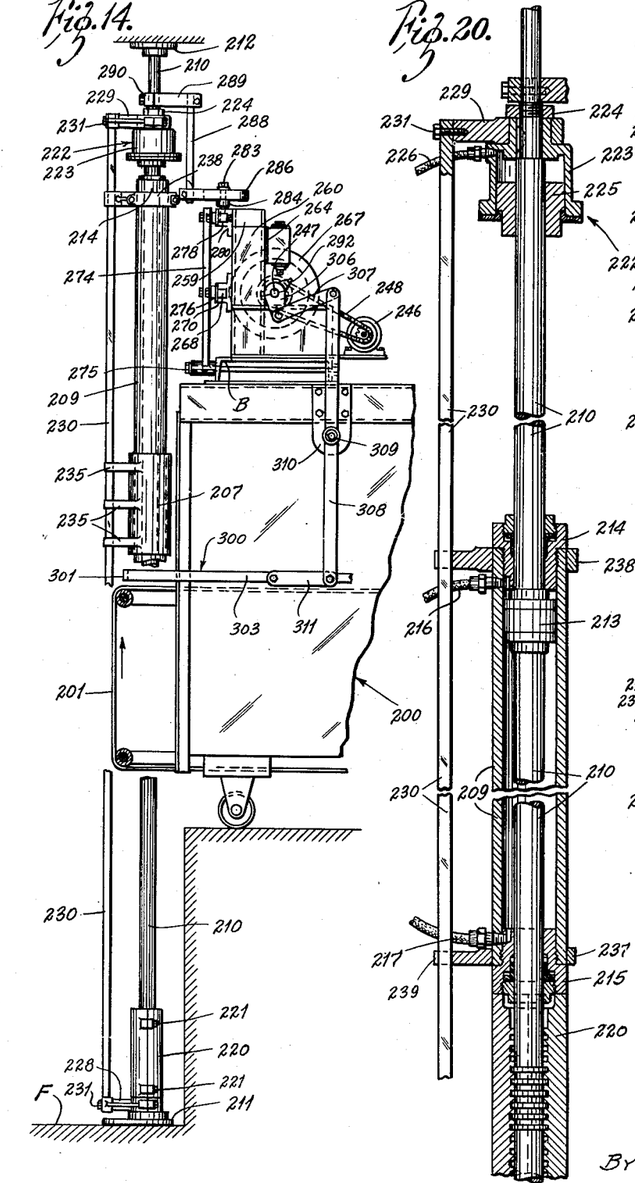
Fig. 14 is a side elevation of a second embodiment of the invention mounted at the mouth of a lehr and taken from the side of the lehr.
Fig. 20 is a vertical section in a plane that is fore-and-aft with respect to the lehr, through the arm holding and elevating mechanism, with the arm supporting cylinder down.
Figure 15:
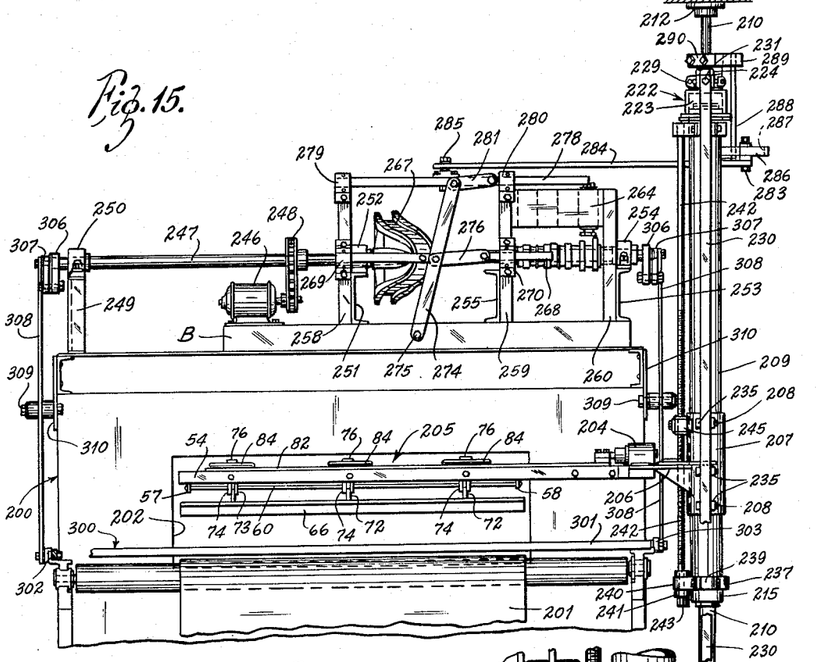
Fig. 15 is a front elevation of the embodiment of Fig. 14 viewed from the entrance end of the lehr.
Figure 16:
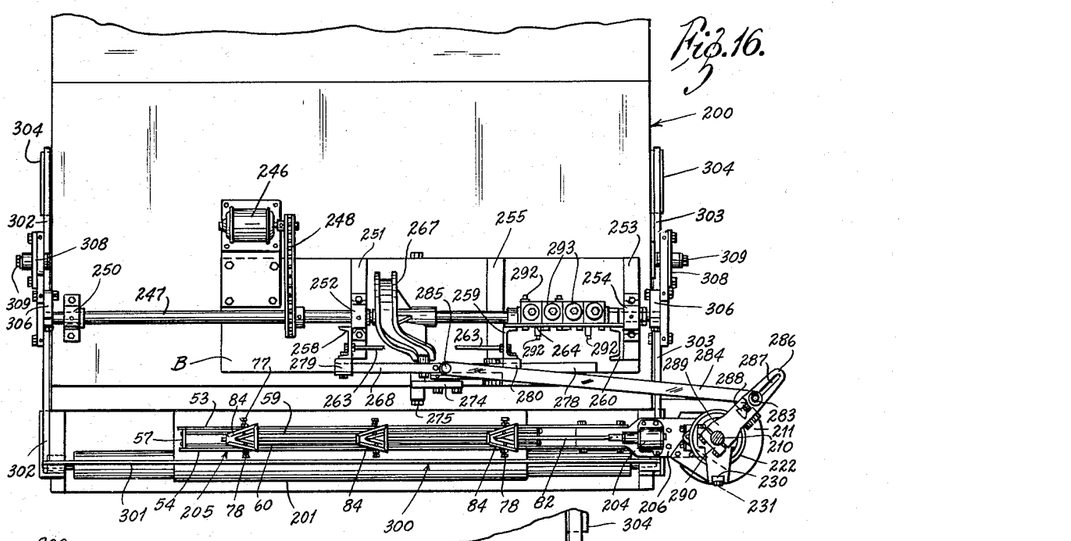
Fig. 16 is a plan view of the embodiment shown in Figs. 14 and 15.
Figure 17:
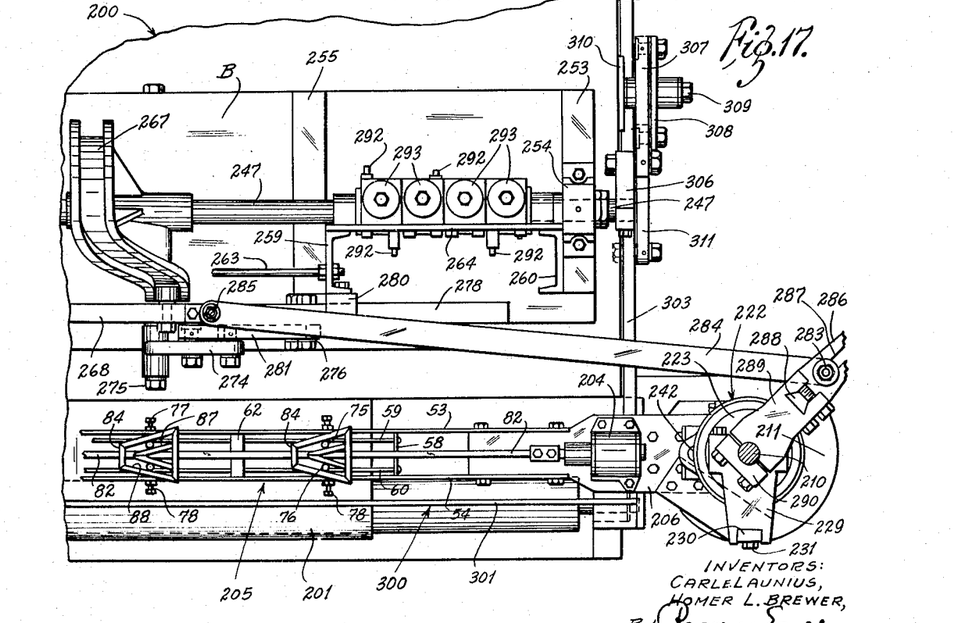
Figs. 17 is an enlarged plan view of the apparatus shown in Fig. 16, but limited to the lower right-hand quarter of the mechanism appearing in Fig. 16.

Surrounding the shaft 210 at its lower end just above the bearing 211, there is an internally threaded split type of bumper 220. This bumper is made in two parts that fit around the shaft and engage corresponding threads on the lower part of the shaft. The bumper elements are held in position by screws 221. As illustrated in Fig. 20, the bumper 220 determines the bottom position of the cylinder 209. In order to adjust the bottom position, the screws 221 are loosened and the bumper 220 may be rotated to a different elevation on the shaft 210, after which the screws 221 are again tightened.

At the upper end of the rod 210, there is a secondary pneumatic motor 222, the cylinder 223 of which fits over a reduced portion of the shaft 210 and rests against a shoulder thereon. It is secured in position by a lock nut 224, and it is keyed to the shaft 210, as particularly illustrated in Figs. 20 and 21. This secondary motor 222 has a piston 225 in it, the lower end of which is of reduced diameter so as to project outwardly below the cylinder. The cylinder 223 has a greater diameter than does the cylinder 209. When the cylinder 209 is moved up by pneumatic action to the position of Fig. 21, its upper head will engage and displace the piston 225, moving it upwardly within the secondary cylinder 223. When air pressure is thereafter introduced through a suitable line 226 into the upper end of the secondary cylinder, the greater effective diameter of the piston 225 will cause it to be moved down and to displace the piston 209 with it the distance represented by the stroke of the secondary piston. The purpose of this will appear hereafter.

Guide means are provided to maintain the alignment of the various parts that are supported on the shaft 210. To this end, there is a lower bracket 228 that is secured to the shaft 210 below the bumper 220, it projecting outwardly as shown. A similar upper bracket 229 surrounds the upper and somewhat reduced end of the secondary cylinder 223. Both of these brackets are of the split clamp type so that they can be positioned and then secured firmly in place so as to be held against angular displacement.

These two brackets support between them a vertical guide rod 230 which preferably is of square cross section. The rod may be securely attached by screws 231 to the two brackets 228 and 229.

The sleeve 207 that holds the arm 205 has a plurality of projections 235. These may be conveniently formed in pairs, one extending out from each half of the sleeve. They project far enough outwardly so that they engage opposite sides of the guide bar 230, thereby limiting rotation of the arm 205 to that of both the shaft 210 and the guide bar 230.

Figures 18, 19:
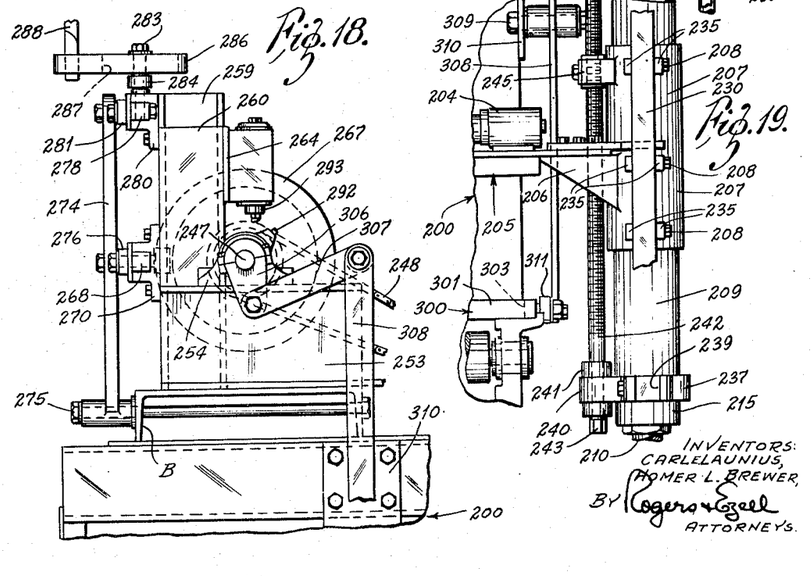
Fig. 18 is an enlarged end view of the valve and linkage mounting and driving shaft taken from the upper right part of Fig. 14.
Fig. 19 is an enlarged view of the adjustable attachment of the ware engaging arm, taken at the right side of Fig. 15.

Additionally, the cylinder 209 itself has lower and upper split clamp guide brackets 237 and 238 that project out and extend on opposite sides of the guide bar 230. They prevent the cylinder itself from uncontrolled rotation. Fig. 19 shows the bracket 237 from its open end and it will be seen that it has a squared notch 239 into which the guide bar 230 fits.

A mechanical drive means is provided for raising and lowering the sleeve 207, and hence the arm 205, on the cylinder 209. To this end, the lower bracket 237 has a laterally projecting ledge 240. This projection receives a bushing 241 that supports the lower end of a threaded rod 242. The rod 242 projects through the bushing and has a hexagonal head 243 at its lower end to receive a wrench.

The rod 242 projects upwardly and is supported in the upper bracket 238 which has a similar lateral projection on it. Between its ends, the threaded shaft 242 passes through a suitably bushed and threaded projection 245 that extends outwardly from the sleeve 207.

By the foregoing means, when the screws 208 are loosened and the shaft 242 is rotated, the sleeve and hence the arm 205 will be adjusted upwardly or downwardly on the cylinder 209. One of the primary purposes of this adjustment is to alter the machine to accommodate ware of different height. After the adjustment is made, the setscrews are again tightened to hold the selected position on the cylinder 209.

The drive for the arm 205 is controlled from the top of the lehr. To this end, there is a suitable base B that is in the form of an inverted channel, as appears in Fig. 14. A driving motor 246 is mounted upon a projection extending backwardly from the base B. This motor drives a main shaft 247 through the means of a sprocket chain 248. The cantilever mounting of the motor 246 aids in maintaining the sprocket chain at proper tension.

The main shaft 247 is supported at one end on a pedestal 249 having a bearing 250 at its upper end through which the shaft 247 passes. Midway of the shaft 247, there is another bracket in the form of a horizontally mounted channel beam 251 on the top of which there is a bearing 252 through which the shaft 247 passes. The right end of the shaft 247 is supported upon a horizontally mounted channel-shaped beam 253 having a bearing 254 at its upper end, through which bearing the shaft 247 passes. Between the two channel brackets 251 and 253, there is an intermediate horizontally disposed channel bracket 255 that acts as a support, as will appear.

Mounted upon the base B adjacent the three channel brackets 251, 255 and 253 are three vertical columns also of channel shape illustrated at 258, 259 and 260. The first two columns 258 and 259 are somewhat higher than the column 260.

A tie rod 263 (Fig. 16) extends between the upper ends of the first two columns 258 and 259 to hold them rigid. The second and third columns 259 and 260 are attached together at their upper ends by a plate 264 that also acts as a valve supporting plate as will appear.

The main shaft 247 operates a cam 267 that corresponds to the cylindrical cam in the first embodiment. It is mounted between the two brackets 251 and 255. The cam 267, by a suitable follower, is designed to reciprocate a lower slide bar 268. This lower slide bar 268 is supported for linear but not angular movement in two bearings 269 and 270 that are attached to the sides of the columns 258 and 259, respectively.

This slide bar 268 is designed to rock a lever 274 that is pivotally supported at 275 onto the base B. A link 276 connects the middle of the lever 274 to the lower slide bar 268. This link 276 is pivotally attached at its ends to the two members.

A secondary or upper slide bar 278 is supported for sliding movements above the slide bar 268 in two bearings 279 and 280 that are attached to the top of the two columns 258 and 259. The slide bar 278 likewise is non-rotatably mounted in these bearings. A link 281 connects the upper ends of the lever 274 to the secondary slide 278 by being pivoted to each of the members at its ends.

The secondary slide bar 278 is adapted to move a pitman 284. The inner end of this pitman 284 is connected by a swivel 285 to the secondary slide bar 278. The outer end of this pitman 284 is swiveled at 283 to a composite crank arm 286. An adjustment is provided between the swivel 285 and the arm 286 in the form of a slot 287, along which the swivel 285 may be adjustably attached.

The crank arm 286 is attached at its inner end securely to a trapezoidal rod 288 that extends vertically from the end of the arm section 286 and is securely attached thereto. The upper end of the arm 288 is firmly clamped in another crank arm portion 289 that, in turn, is clamped by a split clamp 290 to the upper end of the shaft 210.

It thus may be seen that, when the cam 267 is rotated by rotation of the main shaft 247, it will reciprocate the primary slide rod 268, will rock the lever 274, and will reciprocate the secondary slide rod 278. Reciprocation of this latter causes movement of the pitman 284, and hence causes rocking of the composite crank arms 286, 288 and 289. Finally, this last movement provides for rocking of the shaft 210. As the shaft 210 is connected to the cylinder 209 and also to the guide rod 230, it will be seen that the cylinder is thus rocked and with it the arm 205.

The main shaft 247 operates a plurality of cams 292 that are located between the two columns 259 and 260. These cams operate a plurality of valves 293 that are supported on the plate 264 above the cams. These cams control the distribution of pressure and exhaust to the cylinder 209 and to the motor 204. They may be of the type disclosed in the application of Joseph M. Walling, Serial No. 745,670, filed May 2, 1947.

In this embodiment, there is a pusher device 300 for displacing the ware that is released from the arm 205, toward the mouth of the lehr. This pusher is in the form of a bail-shaped member having a primary pushing element 301 extending across the front of the lehr, and two side legs 302 and 303 that extend back on opposite sides of the lehr and are supported in two slide bearings 304 that are mounted on the sides of the lehr. This pusher 300 is moved toward and from the lehr by the shaft 247 and connecting linkage. The linkage is identical at the opposite ends of the shaft 247, so that only one set of links will be described. Reference will be made particularly to the linkage that appears at the right side in Figs. 16 and 17.

The shaft 247 projects beyond the bearing 254 and has at its outer end a crank arm 306. This crank arm, in turn, is pivotally connected to one end of a link 307, the other end of which is pivotally connected to a lever 308 that is generally vertically disposed and is supported in a pivot 309 attached to a bracket 310 which, in turn, is bolted to the side of the lehr.

The lower end of the lever 308 is pivoted to a link 311, the other end of which link is also pivoted to the side portion 303 of the pusher 300. Hence, as the shaft 247 turns, it causes a rocking of the lever 308 and a corresponding movement of the leg 303. Both of the legs 302 and 303 are moved in unison by this arrangement. It will be seen that the maximum outward movement of the pusher 300 is obtained when the crank 306 and the link 307 are substantially in divergent alignment, and that similarly the maximum inward movement takes place when these two parts are substantially in overlapping alignment. This provides for a slight dwell in the inner and outer positions of the pusher.

*Operation of the second embodiment*

The ware take-out conveyor is not illustrated in connection with this embodiment so that it will be understood to be equipped in the same manner as that described in a previous description. In all of the views, the arm 205 is shown in position over the lehr.

This embodiment is shown in connection with a lehr conveyor 201 that is elevated a substantial distance above the floor F and a distance above the position at which the ware take-out lehr is located.

It will be assumed, therefore, that in the position of Fig. 14 the arm is in position wherein it can release the ware onto the conveyor 201, and that such action is effected by operation of the motor 204 which acts in the same manner as the previously described air motor to effect displacement of the rails and release of the ware when the arm 205 is in position directly over the conveyor 201.

In the ware releasing position, air is admitted above the piston 213, so that the cylinder 209 is elevated, but air is also admitted to the secondary cylinder 223 so that its piston has been moved down a short distance, producing a slight lowering of the cylinder 209 and the arm 205. In this position also, the shaft 247 will have operated the cam 267 to the position illustrated, in which the lever 274 is displaced to the right, causing the pitman 284 to have operated the crank assembly 286, 288 and 289 to the position illustrated. Thereupon, the proper cam 292 will actuate a valve 293 to relieve the pressure in the secondary cylinder 223 so that the continuing pressure above the piston 213 in the cylinder 209 will cause a re-elevation of that cylinder to its uppermost position illustrated in Fig. 21. This will lift the arm 205 above the top of the bottles or other objects deposited upon the lehr conveyor 201. Then the cam 267 will begin to retract the slide rod 268, rock the lever 274 to the left and retract the slide 278 to the left. This will cause the thrust link 284 to draw the crank mechanism attached to the shaft 210 counterclockwise in Fig. 17, which will swing the arm 205 away from the mouth of the lehr. This movement will be continued until the arm 205 is again located above and in line with the ware take-out conveyor.

As this takes place, the main shaft 247 operating the crank 306 in a clockwise direction in Fig. 14 will cause the pusher 300 to move the bottles that have been deposited onto the lehr conveyor 201 toward the mouth of the lehr.

A descent of the arm 205 is caused to take place when it is above the position over the take-out conveyor. The proper cams 292 acting upon corresponding valves 293 reverse the pressure and exhaust conditions within the cylinder 209 to relieve the pressure above the piston 213 and, to the extent necessary, if any, to apply pressure below the piston. This causes the arm to descend until it strikes the stop element 220. When it strikes this element 220, it is properly located above the take-out conveyor, so that it again can take a group of bottles when the motor 204 is operated as has been described in connection with the first modification.

Figure 21:
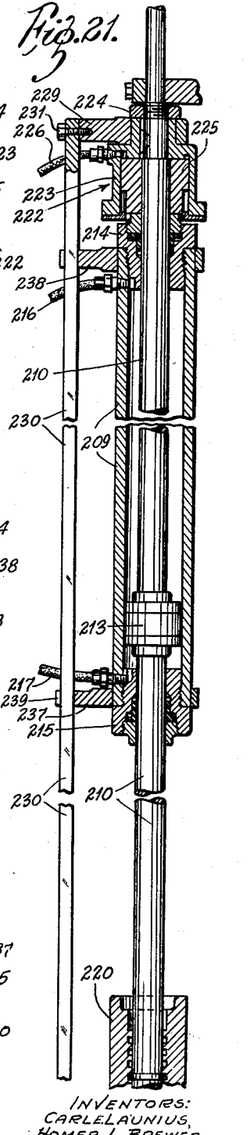
Fig. 21 is a view similar to Fig. 20, but with the arm supporting cylinder in elevating position.

When the arm 205 has grasped a new set of bottles, the air is again admitted above the piston 213 so that the cylinder 209 is again elevated to its upper position illustrated in Fig. 21. Then the cam 267 is rotated almost half a revolution, to swing the arm 205 to above the lehr conveyor 201. This position will dispose the bottoms of the bottles slightly above the lehr conveyor 201. When the arm is properly disposed above the conveyor, the secondary cylinder 223 is charged with air under pressure, so that it causes a short descent of the arm to deposit the bottles onto the lehr, at which time the rails of the arm 205 are again opened to release the ware. In the meanwhile, the rotation of the arm 247 will have returned the pusher 300 to its outer position to receive the new charge of bottles.

As already noted, the relative positions of the two conveyers angularly to each other can be accommodated by adjusting the end of the link 284 to the crank arm 285, which is effected by adjusting the swivel 285 along the slot 287.

The adjustment of the arm 205 to accommodate ware of different heights has already been described as being effected by rotation of the threaded shaft 242.

Obviously, the several cams can be designed or adjusted to obtain the proper timing.

It will be seen that this second embodiment includes the features of the first embodiment, and, in addition, it provides for operating with two conveyers at different heights, and it also provides the ware pusher. It will of course be understood that, when the lehr conveyor is below the ware take-out conveyor, the operation of the cylinder will be reversed, in that the arrangement will be made to have the cylinder descend from the ware take-out conveyor to the lehr loading conveyor.

In either machine, the base may be tilted to accommodate sloping conveyors. For example, if the conveyor 31 slopes at an angle, the shaft 42 will be tilted (as by tilting the base 36) until the arm 45 lies parallel to the conveyor 31. Preferably the shaft is tilted in a vertical plane at right angles to the vertical plane it occupies when transverse to the lehr conveyor. Then the arm will be horizontal when over the lehr conveyer.

What is claimed is:

1. In a machine for transferring a row of items such as bottles from one position to another horizontally displaced from and at angle to the first position; a base, an arm having means to engage and hold the row of items, a vertical shaft mounted on the base, means mounting the arm on the shaft, vertical movement means for raising and lowering the arm on the axis of the shaft, means for swinging the arm about the axis of the shaft, the vertical movement means including means to elevate the arm from its first position and to lower it to its second position, and to change its elevation by making one of said vertical movement components greater than the other, and the swinging means having operating control mechanism to cause swinging of the arm from its first to its second positions.

2. In a machine for transferring a row of items such as bottles from one position to another horizontally displaced from and at angle to the first position; a base, an arm having means to engage and hold the row of items, a vertical shaft mounted on the base, means mounting the arm on the shaft, vertical movement means for raising and lowering the arm on the axis of the shaft, means for swinging the arm about the axis of the shaft, the vertical movement means including means to elevate the arm from its first position and to lower it to its second position, and to change its elevation by making one of said vertical movement components greater than the other, and the swinging means having operating control mechanism to cause swinging of the arm from its first to its second positions, said vertical movement means comprising a fluid motor with a piston and cylinder on one of which the arm is fastened and the other of which is secured to the shaft, and means to regulate admission of fluid to the motor.

3. In a machine for transferring a row of items such as bottles from one position to another horizontally displaced from and at angle to the first position, a base, an arm having means to engage and hold the row of items, a vertical shaft mounted on the base, means mounting the arm on the shaft, vertical movement means for raising and lowering the arm on the axis of the shaft, means for swinging the arm about the axis of the shaft, the vertical movement means including means to elevate the arm from its first position and to lower it to its second position, and to change its elevation by making one of said vertical movement components greater than the other, and the swinging means having operating control mechanism to cause swinging of the arm from its first to its second positions, said vertical movement means comprising a fluid motor with a piston and cylinder on one of which the arm is fastened and the other of which is secured to the shaft, and means to regulate admission of fluid to the motor, and also including selectively operable means for displacing the arm and the fluid motor means oppositely to one displacement thereof produced by the fluid, the selectively operable means being of greater force than the force of the fluid motor means, to overcome the same without removing the force of the fluid motor means.

4. In a machine for transferring a row of items such as bottles from one position to another horizontally displaced from and at angle to the first position; a base, an arm having means to engage and hold the row of items, a vertical shaft mounted on the base, means mounting the arm on the shaft, vertical movement means for raising and lowering the arm on the axis of the shaft, means for swinging the arm about the axis of the shaft, the vertical movement means including means to elevate the arm from its first position and to lower it to its second position, and to change its elevation by making one of said vertical movement components greater than the other, and the swinging means having operating control mechanism to cause swinging of the arm from its first to its second positions, said vertical movement means comprising a fluid motor with a piston and cylinder on one of which the arm is fastened and other of which is secured to the shaft, and means to regulate admission of fluid to the motor, and also including selectively operable means for displacing the arm and the fluid motor means oppositely to one displacement thereof produced by the fluid, the selectively operable means being of greater force than the force of the fluid motor means, to overcome the same without removing the force of the fluid motor means, the selectively operable means comprising a second fluid motor.

5. In a machine for transferring a row of items such as bottles from one position to another horizontally displaced from and at angle to the first position; a base, an arm having means to engage and hold the row of items, a vertical shaft mounted on the base, means mounting the arm on the shaft, vertical movement means for raising and lowering the arm on the axis of the shaft, means for swinging the arm about the axis of the shaft, the vertical movement means including means to elevate the arm from its first position and to lower it to its second position, and to change its elevation by making one of said vertical movement components greater than the other, and the swinging means having operating control mechanism to cause swinging of the arm from its first to its second positions, the vertical movement means including a fluid motor having a piston fixed to the shaft, and a cylinder movably mounted on the shaft, the arm being attached to the cylinder, and means to regulate the admission of fluid to the cylinder.

6. In a machine for transferring a row of items such as bottles from one position to another horizontally displaced from and at angle to the first position; a base, an arm having means to engage and hold the row of items, a vertical shaft mounted on the base, means mounting the arm on the shaft, vertical movement means for raising and lowering the arm on the axis of the shaft, means for swinging the arm about the axis of the shaft, the vertical movement means including means to elevate the arm from its first position and to lower it to its second position, and to change its elevation by making one of said vertical movement components greater than the other, and the swinging means having operating control mechanism to cause swinging of the arm from its first to its second position, the vertical movement means including a fluid motor having a piston fixed to the shaft, and a cylinder movably mounted on the shaft, the arm being attached to the cylinder, and means to regulate the admission of fluid to the cylinder, and the swinging means being connected with the cylinder to move it and the arm together.

7. In a machine for transferring a row of items such as bottles from one position to another horizontally displaced from and at angle to the first position; a base, an arm having means to engage and hold the row of items, a vertical shaft mounted on the base, means mounting the arm on the shaft, vertical movement means for raising and lowering the arm on the axis of the shaft, means for swinging the arm about the axis of the shaft, the vertical movement means including means to elevate the arm from its first position and to lower it to its second position, and to change its elevation by making one of said vertical movement components greater than the other, and the swinging means having operating control mechanism to cause swinging of the arm from its first to its second positions, the vertical movement means including a fluid motor having a piston fixed to the shaft, and a cylinder movably mounted on the shaft, the arm being attached to the cylinder, and means to regulate the admission of fluid to the cylinder, and a supplemental fluid motor including a piston and a cylinder, the supplemental motor having its fluid driven element in the path of movement of the first cylinder at the end of the stroke thereof, and displaced thereby, and means to regulate fluid pressure application to the second cylinder, to force the first cylinder and arm backwardly against the force of the first fluid motor.

8. In a lehr loader for transporting a row of bottles from a first conveyer to a lehr conveyer; an arm for engaging and holding the row of bottles, a vertical shaft, means including a fluid motor, with a piston and cylinder one of which is fixed and the other of which is vertically movable, the arm being mounted on the vertically movable part, a main drive shaft, means connected therewith to oscillate the vertical shaft upon rotation of the main shaft, to displace the arm from the first conveyer to the lehr conveyer; means controlled from the main drive shaft to produce operation of the fluid motor to elevate the arm from the first conveyer position to above the second conveyer position in timed relationship to the angular movement of the arm to the second conveyer position; and means operable after the arm is above the second conveyer position to depress it a predetermined amount and thereafter to re-elevate it.

9. In a lehr loader for transporting a row of bottles from a first conveyer to a lehr conveyer; an arm for engaging and holding the row of bottles, a vertical shaft, means including a fluid motor, with a piston and cylinder one of which is fixed and the other of which is vertically movable, the arm being mounted on the vertically movable part, a main drive shaft, means connected therewith to oscillate the vertical shaft upon rotation of the main shaft, to displace the arm from the first conveyer to the lehr conveyer; means controlled from the main drive shaft to produce operation of the fluid motor to elevate the arm from the first conveyer position to above the second conveyer position in timed relationship to the angular movement of the arm to the second conveyer position; and means operable after the arm is above the second conveyer position to depress it a predetermined amount and thereafter to re-elevate it, and ware pushing means moved by the main drive shaft adjacent the second conveyer position, across beneath the arm, in timed relation to and after the arm has been depressed.

10. In a lehr loader for transporting a row of bottles from a first conveyer to a lehr conveyer; an arm for engaging and holding the row of bottles, a vertical shaft, means including a fluid motor, with a piston and cylinder one of which is fixed and the other of which is vertically movable, the arm being mounted on the vertically movable part, a main drive shaft, means connected therewith to oscillate the vertical shaft upon rotation of the main shaft, to displace the arm from the first conveyer to the lehr conveyer; means controlled from the main drive shaft to produce operation of the fluid motor to elevate the arm from the first conveyer position to above the second conveyer position in timed relationship to the angular movement of the arm to the second conveyer position; and means operable after the arm is above the second conveyer position to depress it a predetermined amount and thereafter to re-elevate it, and ware pushing means moved by the main drive shaft adjacent the second conveyer position, across beneath the arm, in timed relation to and after the arm has been depressed, said last-named means including a pusher bar and linkage connecting it to the main drive shaft.

11. In a lehr loader for transporting a row of bottles from a first conveyer to a lehr conveyer; an arm for engaging and holding the row of bottles, a vertical shaft, means including a fluid motor, with a piston and cylinder one of which is fixed and the other of which is vertically movable, the arm being mounted on the vertically movable part, a main drive shaft, means connected therewith to oscillate the vertical shaft upon rotation of the main shaft, to displace the arm from the first conveyer to the lehr conveyer; means controlled from the main drive shaft to produce operation of the fluid motor to elevate the arm from the first conveyer position to above the second conveyer position in timed relationship to the angular movement of the arm to the second conveyer position; and means operable after the arm is above the second conveyer position to depress it a predetermined amount and thereafter to re-elevate it, the means to oscillate the vertical shaft including an adjustable connection between the drive shaft and the vertical shaft to translate rotation of the drive shaft into a selectable amount of angular movement of the vertical shaft.

12. In a lehr loader for transporting a row of bottles from a first conveyer to a lehr conveyer; an arm for engaging and holding the row of bottles, a vertical shaft, means including a fluid motor, with a piston and cylinder one of which is fixed and the other of which is vertically movable, the arm being mounted on the vertically movable part, a main drive shaft, means connected therewith to oscillate the vertical shaft upon rotation of the main shaft, to displace the arm from the first conveyer to the lehr conveyer; means controlled from the main drive shaft to produce operation of the fluid motor to elevate the arm from the first conveyer position to above the second conveyer position in timed relationship to the angular movement of the arm to the second conveyer position; and means operable after the arm is above the second conveyer position to depress it a predetermined amount and thereafter to re-elevate it, the means to oscillate the vertical shaft including an adjustable connection between the drive shaft and the vertical shaft to translate rotation of the vertical shaft, said connection including a cam on the drive shaft, a follower reciprocated by rotation of the cam, a crank arm on the vertical shaft, and a pitman between the follower and the crank arm.

13. In a machine for transferring a row of items such as bottles from one position to another horizontally displaced from and at angle to the first position; a base, an arm having means to engage and hold the row of items, a vertical shaft mounted on the base, means mounting the arm on the shaft, vertical movement means for raising and lowering the arm on the axis of the shaft, means for swinging the arm about the axis of the shaft, the vertical movement means including means to elevate the arm from its first position and to lower it to its second position, and to change its elevation by making one of said vertical movement components greater than the other, and the swinging means having operating control mechanism to cause swinging of the arm from its first to its second positions, and means to adjust the initial vertical position of the arm on the vertical shaft.

14. In an object handling device, a pair of oppositely disposed elongated object engaging members adapted to be initially spaced to receive a plurality of objects between them, a single motive means for moving the members into, and out of, object engaging position with the objects between them, and a plurality of actuating means to move the elongated members, spaced along their lengths, means connecting the several actuating means with the motive means for simultaneous operation by the motive means of all of the actuating means, each actuating means including a camming device movable back and forth for displacing the two members, and the connecting means comprising a rigid connecting device connecting all of the camming devices to the motive means.

15. In a ware handling machine, a support, a first shaft thereon, a second shaft geared to the first to rotate half as fast as the first shaft, a ware holding arm, a vertical shaft upon which the arm is mounted, a cam-type power take-off means between the vertical shaft and the first shaft to elevate the vertical shaft and lower the same for each revolution of the first shaft, a second cam-type power take-off device between the second shaft and the vertical shaft to swing the vertical shaft angularly from a first position to a second position and back again for each revolution of the second shaft, and means in said second power take-off device to adjust the amount of angular movement of the vertical shaft.

16. In a ware handling machine, a support, a first shaft thereon, a second shaft geared to the first to rotate half as fast as the first shaft, a ware holding arm, a vertical shaft upon which the cam is mounted, a cam-type power take-off means between the vertical shaft and the first shaft to elevate the vertical shaft and lower the same for each revolution of the first shaft, a second cam-type power take-off device between the second shaft and the vertical shaft to swing the vertical shaft angularly from a first position to a second position and back again for each revolution of the second shaft, means in said second power take-off device to adjust the amount of angular movement of the vertical shaft, and means to adjust the position of the arm on the vertical shaft.

17. In a ware handling machine, a support, a first shaft thereon, a second shaft geared to the first to rotate half as fast as the first shaft, a ware holding arm, a vertical shaft upon which the cam is mounted, a cam-type power take-off means between the vertical shaft and the first shaft to elevate the vertical shaft and lower the same for each revolution of the first shaft, a second cam-type power take-off device between the second shaft and the vertical shaft to swing the vertical shaft angularly from a first position to a second position and back again for each revolution of the second shaft, means in said second power take-off device to adjust the amount of angular movement of the vertical shaft, means to adjust the position of the arm on the vertical shaft, the ware holding arm having ware engaging means movable between engaging and releasing positions, means to move the same, and means connected with one of said first two shafts to time the operation of said moving means.

18. In a glassware lehr-loader for transferring a file of glassware items on a conveyer, moving in file, to a second conveyer for disposition across the second conveyer: comprising a base; a vertical shaft on the base; an arm mounted on the shaft and extending outwardly therefrom generally horizontally to overlie the file of items, there being mounting means for holding the arm on the shaft at a fixed angle to the axis of the shaft; a pair of ware-engaging elements depending below the arm and extending parallel to each other, means mounting the elements for movements toward each other to engage the ware items and away from each other; means to move the elements as aforesaid, comprising a fluid motor having a piston reciprocable lengthwise of the arm, and means connecting the piston to the elements to cause the movements of the elements toward and from each other upon reciprocation of the piston back and forth; means for swinging the arm back and forth about the axis of the vertical shaft from its aforesaid initial position to a second position adjacent the second conveyer for transferring the arm from the first conveyer to the second, and means for elevating and lowering the arm; a power shaft, and mechanism operated by the power shaft for causing the swing means and elevating means to operate in timed relationship from rotation of the shaft.

19. The combination of claim 18 wherein the last-named mechanism includes mechanical connections for mechanically causing one of said means to operate.

20. The combination of claim 18 wherein the last-named mechanism includes fluid motor means controlled from the power shaft for causing one of said means to operate.

21. The combination of claim 18 with a ware-pusher adjacent the second position of the arm, and means connected with the power shaft for causing movement of the ware pusher in timed relation to the operation of the swinging and elevating means.

22. The combination of claim 18 wherein the last-named mechanism thereof includes mechanical connections for mechanically operating one of its component means, and wherein there is a ware-pusher adjacent the second position of the arm, and means connected with the power shaft for causing movement of the ware-pusher in timed relation to the operation of the swinging means and elevating means.

23. The combination of claim 18 wherein the connecting means between the piston and ware-engaging elements comprises a multiple cam arrangement attached to the piston, and multiple cam followers along the arm and engaged with the multiple cam arrangement.

24. The combination of claim 18 wherein the fluid motor for moving the elements is mounted on the arm itself, and the connecting means from the piston comprises a member fixed to the piston and extending along the arm and means operated by the member for moving the elements.

CARL E. LAUNIUS.
HOMER L. BREWER.

References Cited in the file of this patent

UNITED STATES PATENTS

| Number | Name | Date |
|---|---|---|
| 1,567,725 | Freese | Dec. 29, 1925 |
| 1,733,547 | Lorenz | Oct. 29, 1929 |
| 1,843,285 | Ingle | Feb. 2, 1932 |
| 1,867,389 | Sylvester | July 12, 1932 |
| 1,870,506 | Hardman | Aug. 9, 1932 |
| 1,974,837 | Shillinger | Sept. 25, 1934 |
| 1,979,763 | Olson | Nov. 6, 1934 |
| 1,990,745 | Moore | Feb. 12, 1935 |
| 2,431,320 | Fischer | Nov. 25, 1947 |